United States Patent

Brieskorn

[11] Patent Number: 5,883,896
[45] Date of Patent: Mar. 16, 1999

[54] ARRANGEMENT FOR COUPLING OPTIONAL AUXILIARY DEVICES TO TERMINAL EQUIPMENT OF PRIVATE BRANCH EXCHANGES

[75] Inventor: Juergen Brieskorn, Geltendorf, Germany

[73] Assignee: Siemens Aktiengesellschaft, Munich, Germany

[21] Appl. No.: 670,225

[22] Filed: Jun. 21, 1996

[30] Foreign Application Priority Data

Jun. 29, 1995 [DE] Germany ................ 195 23 797.8

[51] Int. Cl.$^6$ ................... H04L 12/66
[52] U.S. Cl. ............... 370/463; 370/421; 370/426
[58] Field of Search ............... 379/225; 370/524, 370/420, 421, 465, 425, 426, 463

[56] References Cited

U.S. PATENT DOCUMENTS

| | | | |
|---|---|---|---|
| 4,736,361 | 4/1988 | Cooperman et al. | 370/58 |
| 5,305,312 | 4/1994 | Fornek et al. | 370/264 |
| 5,349,640 | 9/1994 | Dunn et al. | 379/387 |
| 5,450,486 | 9/1995 | Maas et al. | 379/399 |
| 5,631,955 | 5/1997 | Adam et al. | 379/387 |
| 5,717,692 | 2/1998 | Blackwell | 370/463 |

FOREIGN PATENT DOCUMENTS

| | | |
|---|---|---|
| 589064 B2 | 3/1988 | Australia. |
| 0 288 935 A2 | 2/1988 | European Pat. Off.. |
| 0 494 530 A2 | 1/1992 | European Pat. Off.. |
| 0 512 351 A2 | 11/1992 | European Pat. Off.. |
| 0 594 244 A2 | 4/1994 | European Pat. Off.. |
| 3402978 A 1 | 1/1985 | Germany. |
| 2 261 573 | 5/1993 | United Kingdom. |

OTHER PUBLICATIONS

ETSI DRAFT pr–I–ETS 300 245–4, Intergrated Services Digital Network (ISDN) Technical charateristic of telefony terminals, Part 4: Additional Equipment Interface (AEI), Jun. 1993.

Blab, H. et al,: Dopplenutzen mit Zweikanaltelefonen, In telecom report 14 (1991) vol. 6, pp. 307–309.

*Primary Examiner*—Ajit Patel
*Assistant Examiner*—Bob A. Phunkulh
*Attorney, Agent, or Firm*—Hill & Simpson

[57] ABSTRACT

The arrangement is for coupling optional additional equipment to terminal equipment of private branch exchanges via an additional equipment interface, particularly according to the ETSI standard. The terminal equipment has an option bus via which arbitrary additional equipment can be connected. An additional equipment driver specific to the additional equipment and that represents the additional equipment interface is provided in the private branch exchange. The terminal equipment provides a communication channel between the additional equipment and the additional equipment driver in the private branch exchange via which the additional equipment and the additional equipment driver communicate according to a protocol specific to the additional equipment.

12 Claims, 3 Drawing Sheets

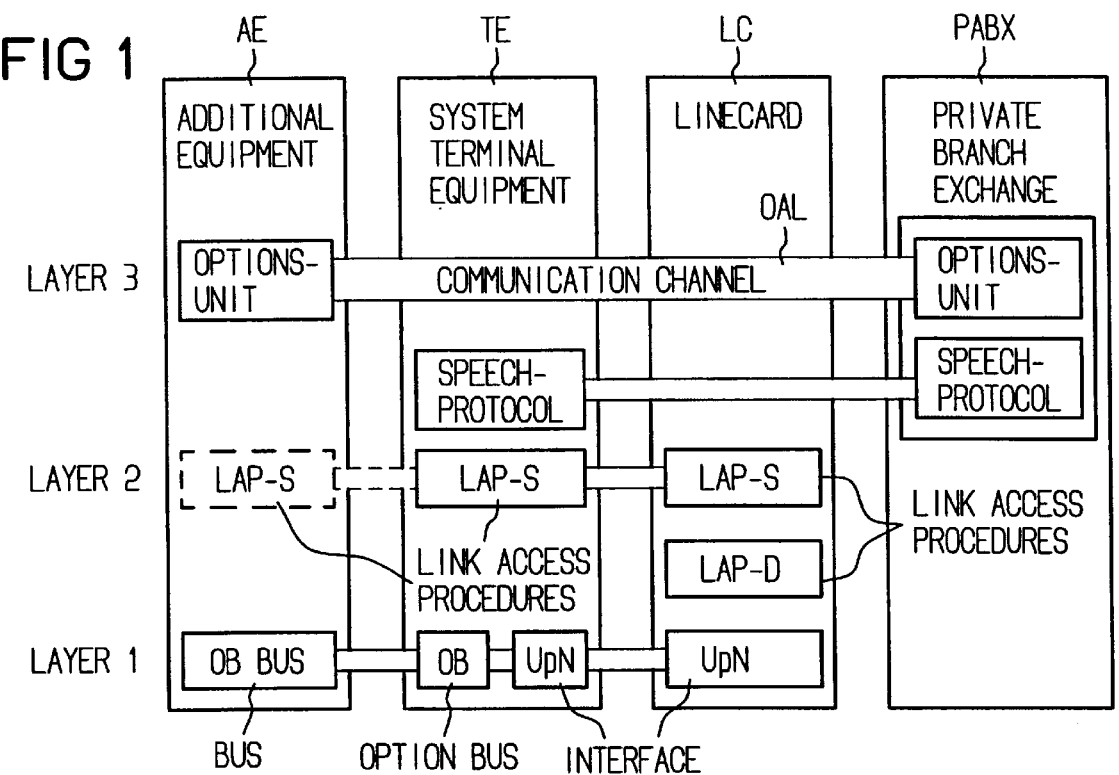
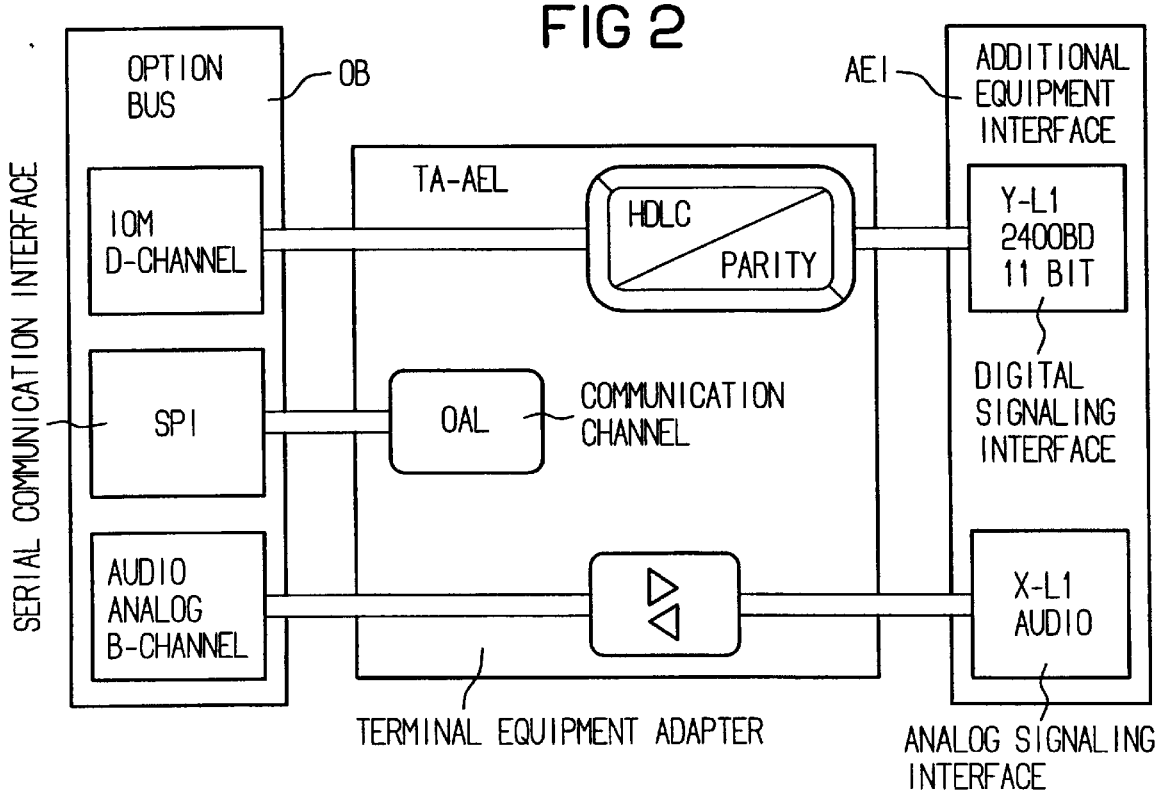

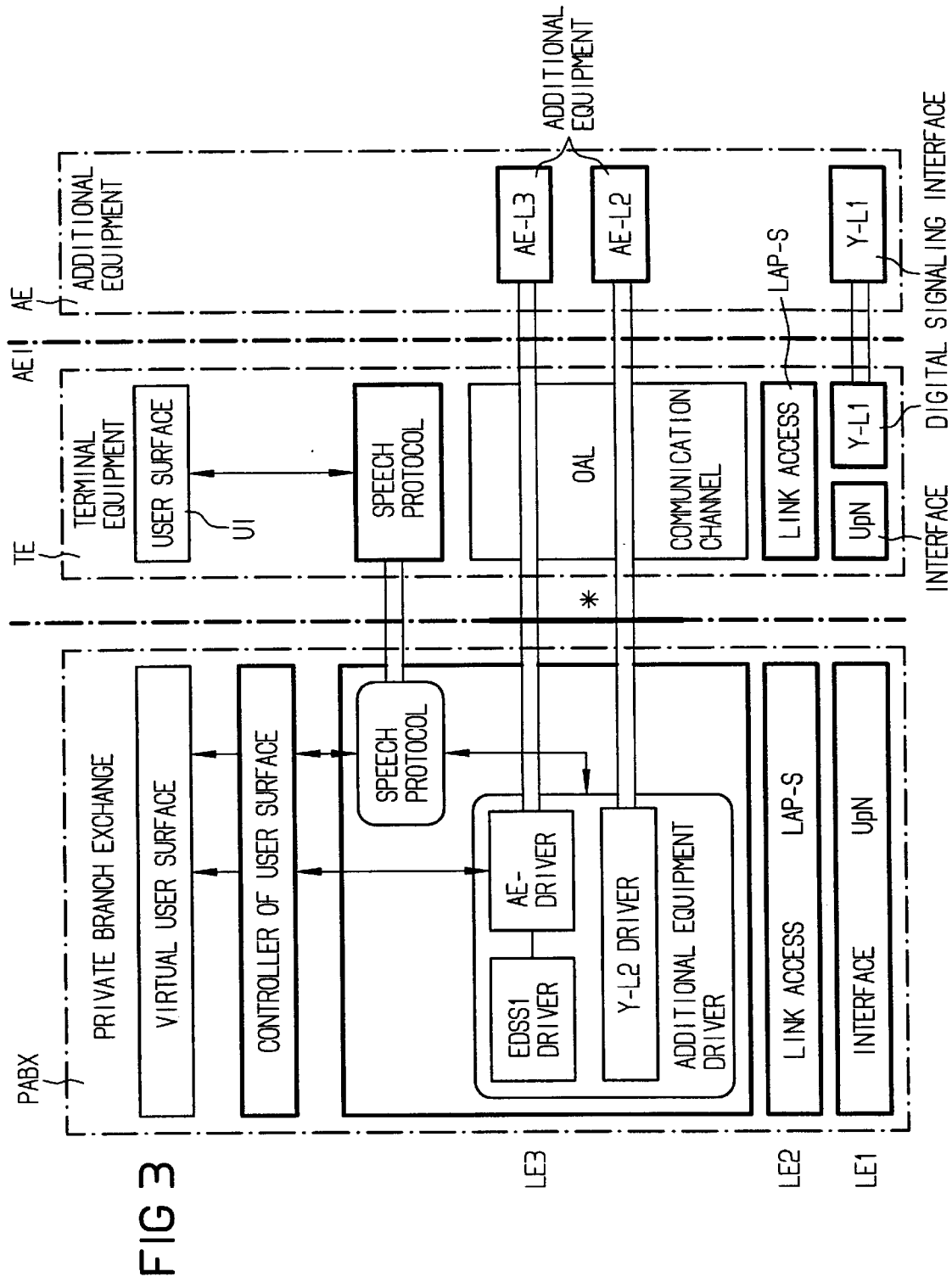

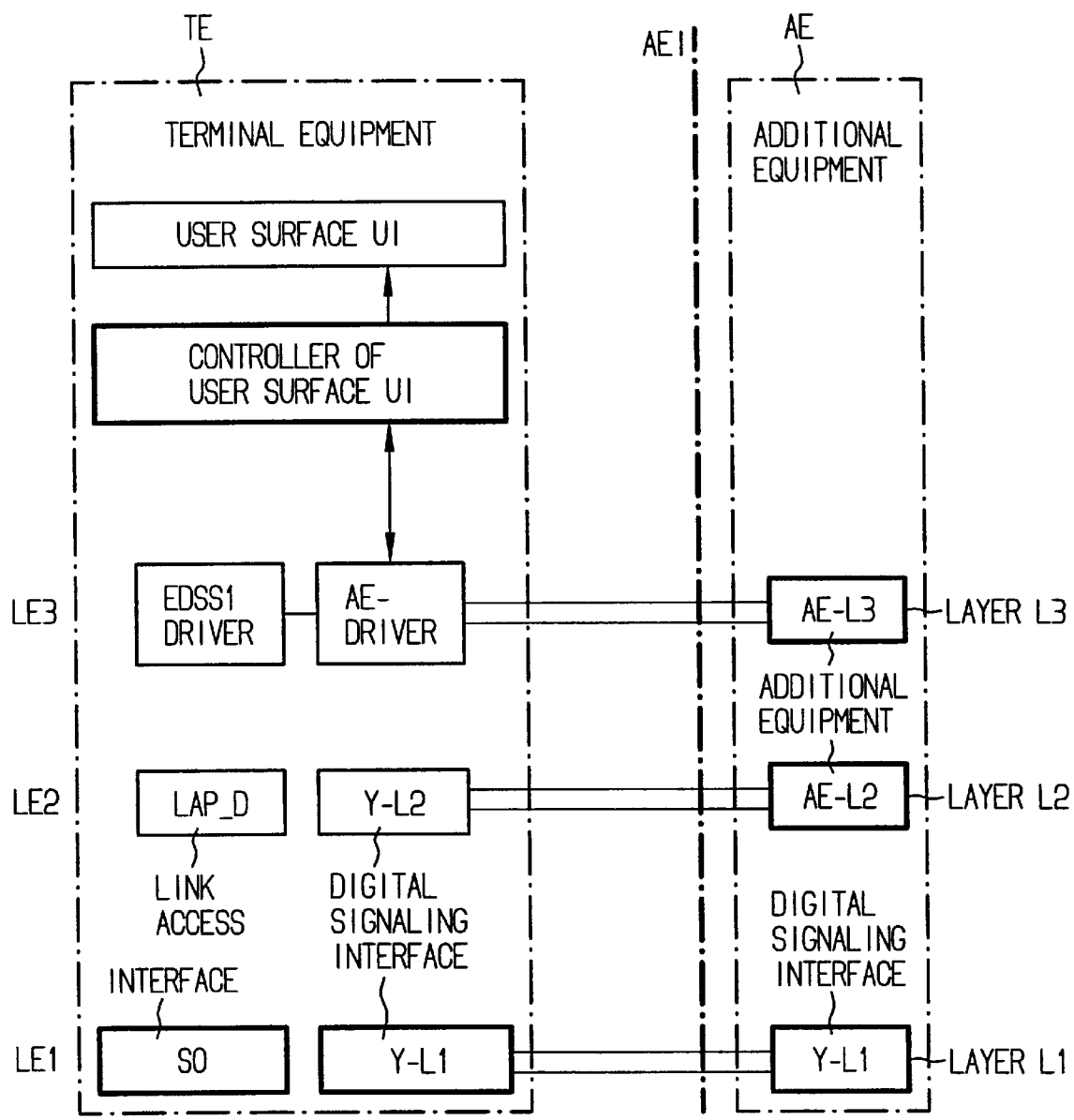

ARRANGEMENT FOR COUPLING OPTIONAL AUXILIARY DEVICES TO TERMINAL EQUIPMENT OF PRIVATE BRANCH EXCHANGES

BACKGROUND OF THE INVENTION

The present invention is directed to an arrangement for coupling optional auxiliary devices to terminal equipment of private branch exchanges, particularly via an auxiliary device interface defined according to ETSI (European Telecommunications Standards Institute).

The auxiliary device interface ("AEI"; "Additional Equipment Interface") defined according to ETSI is increasingly gaining in significance with the area-covering introduction of Euro-ISDN (DSS1). Such an interface is defined in "ETSI DRAFT pr I-ERTS 300 245-4", Integrated Service Digital Network (ISDN), Technical characteristic of telephony terminals, Part 4: Additional Equipment Interface (AEI), June 1993. The AEI specification according to ETSI defines a combination of four interfaces, whereby the terminal equipment can support one interface or a combination of interfaces. These interfaces are: an analog 4-wire interface (X); a digital 4-wire signalling interface (Y); an analog 2-wire interface ($Z_A$); an ON/OFF [or: IN/OUT] signal interface ($Z_B$)

This interface defined according to ETSI is an additional equipment interface that sequences the communication between Euro-ISDN terminal equipment and additional equipment (such as, for example, a name key console or a selection aid interface for a personal computer) with functional messages. Euro-ISDN terminal equipment are based on the protocols Q.921 and Q.931/932 according to the CCITT Standard. The exchange and the terminal equipment are thereby automatic status devices.

The functional AEI unit is locally arranged in the terminals equipment and requires a local DSS1 and AEI automatic status device. These local demands represent a considerable added outlay for a Euro-ISDN terminal equipment when activating the AEI unit. Due to the function distribution, each performance feature of the AEI is completely and mandatorily defined in the signalling. A modification or expansion of the performance features in the AEI therefore requires a software modification in the Euro-ISDN terminal equipment.

It can also be necessary to activate an AEI unit for system terminal equipment such as, for example, of the type Symphony of Siemens that have a stimulus function division and that do not employ DSS1 as a signalling protocol. In stimulus terminal equipment, the function distribution is such that only the exchange is an automatic status device, whereas the terminal equipment is a pure input/output device. This requires a smaller processor and less program memory space. Such proprietary stimulus terminal equipment are therefore the only present possibility for manufacturing what are referred to as absolute low-cost terminal equipment, since the functional Euro-ISDN terminal equipment require component parts and software that do not allow the prices of the stimulus terminal equipment to be achieved. However, the local utilization of an AEI unit also leads to a considerable outlay in the terminal equipment given stimulus terminal equipment and, correspondingly, is economically and technologically unfeasible.

SUMMARY OF THE INVENTION

It is an object of the present invention to provide an arrangement having, given a terminal equipment that neither communicates via DSS1 with an automatic private branch exchange nor pre-performs a functional status machine, an additional equipment interface that, in particular, conforms to the ETSI standard.

In general terms the present invention is an arrangement for coupling optional additional equipment to terminal equipment of private branch exchanges via an additional equipment interface. The terminal equipment has an option bus that physically realizes the additional equipment interface and via which arbitrary additional equipment can be connected. An additional equipment driver for realizing an additional equipment protocol and that is specific to the additional equipment is provided in the private branch exchange. Communication means for realizing a communication channel between the additional equipment and the additional equipment driver in the private branch exchange are provided in the terminal equipment and in the private branch exchange. The additional equipment and the additional equipment driver communicate over the communication channel according to the protocol specific to the additional equipment.

Advantageous developments of the present invention are as follows.

The additional equipment interface is realized by a plug-type connection adapter.

The option bus and the additional equipment driver specific to the additional equipment are realized by at least one or by a combination of the interfaces defined according to the AEI specification of ETSI.

This inventive arrangement has the advantage that the additional equipment interface can be made available at every terminal equipment that offers an options bus without having to modify the terminal equipment. Function modifications and expansions in the interface unit, for example due to software modifications, are not reflected in the terminal equipment. On the contrary, an adaptation is to be implemented centrally only once in the private branch exchange of the additional equipment driver. For example, new types of additional equipment can therefore be connected to the terminal equipment without modifications in the terminal equipment.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts the fundamental principle of a communication channel between an additional equipment and a private branch exchange;

FIG. 2 depicts an example of the realization of layer 1 with a terminal equipment adapter;

FIG. 3 depicts the embedding of an additional equipment interface according to a preferred exemplary embodiment of the present invention, which supports a D-channel layer 3 signalling interface, into the architecture of the communication channel of a telephone of the Symphony type;

FIG. 4 depicts the embedding of an additional equipment interface according to another preferred exemplary embodiment of the present invention, which supports a D-channel layer 3 signalling interface, into the architecture of the communication channel of a telephone of the E-DSS1 type.

DESCRIPTION OF THE PREFERRED EMBODIMENTS

The present invention shall now be explained on the basis of FIG. 1 with reference to the example of a system terminal equipment of the Symphony type by Siemens.

The interface $U_{PN}$ of the system terminal equipment Symphony is designed as a 2-channel interface. The function split of the system terminal equipment TE is based on a stimulus protocol, whereby the system terminal equipment makes exclusive use of its speech functions and thus exclusively terminates the speech protocol. The Symphony terminal equipment makes what is referred to as an option bus OB available to additional equipment and to which arbitrary additional equipment AE (options=additional equipment) are connected either directly or via adapters. This option bus OB serves for physical coupling (layer 1) between telephone equipment TE and additional equipment AE (option). The additional equipment AE must thereby correspond to layer 1 of the option bus OB. A terminal equipment adapter TA-AE1 provides the layer 1 and the mechanical connecting equipment at the terminal equipment. Such an adapter is shown by way of example in FIG. 2 and shall be explained later.

As shown in FIG. 1, the Symphony terminal equipment makes a layer 3 communication channel OAL (Option Application Link) between the layer 3 option unit in the additional equipment AE and the actual additional equipment driver or, respectively, the option unit in the automatic private branch exchange PABX available for the logical coupling. The additional equipment driver is specific to the respective additional equipment and represents layer 3 in the private branch exchange PABX. The terminal equipment thus offers only a universal, transparent transport channel for all (including future) options.

The data link layer, layer 2 according to the 7-layer OSI model, is shown with LAP-S and LAP-D in FIG. 1 (LAP=Link Access Procedure). LAP-D is thereby the ISDN standard layer 2 according to CCITT Q.921. LAP-S is a layer 2 specific to the Symphony system of Siemens that is derived from LAP-D and is a functional subset of LAP-D.

The line card LC also shown in FIG. 1 represents the physical termination of the subscriber line at the exchange side (subscriber circuit). The line card terminates the layer 1 and the layer 2 of the subscriber interface. The actual exchange control (layer-3 protocol) is terminated in the exchange.

According to the present invention, the entire functional logic is sequenced in the private branch exchange PABX. The terminal equipment TE only makes the communication channel OAL available. As a result thereof, an additional equipment AE connected to the terminal equipment adapter TA-AEI is given the impression of communicating with an AEI unit that is located immediately in the terminal equipment.

The terminal equipment adapter TA-AEI converts layer 1 of the additional equipment interface AEI into the interfaces of the option bus OB. The terminal equipment adapter and the terminal equipment only act as a transit line for layers 2 and 3 of the additional equipment interface. The additional equipment driver terminates layers 2 and 3 of the terminal equipment adapter at the side of the private branch exchange. The architecture of the communication channel OAL is designed such that the additional equipment sees the same units in a telephone of the Symphony type or of the E-DSS1 type.

FIG. 2 shows an example of the realization of layer 1 (L1) by the terminal equipment adapter TA-AEI. In this example, the layer 1 of an analog interface X-L1 and of a digital signalling interface Y-L1 is converted into the interfaces of the option bus OB. The option bus is composed of the logical interfaces IOM, SPI and audio. IOM is an interface between complex ISDN-specific semiconductor modules. It is an internal apparatus interface and also serves as interface to pluggable auxiliary devices. IOM is a synchronous, bidirectional interface that, among other things, contains the 2B-channels defined in ISDN and the signalling channel (D-channel). SPI is a serial communication interface between single chip processors and audio is an analog access to B-channel information. The option receptacle serves for the introduction of additional equipment that are thereby electrically connected to the option bus OB. The analog interface X-L1 of the additional equipment interface AEI is bidirectionally connected to the corresponding audio access of the option bus OB via the terminal equipment adapter TA-AEI, whereas the digital signalling interface Y-L1 is connected to the synchronous bidirectional interface IOM of the option bus OB by the terminal equipment adapter via an HDLC transmission method with parity check.

As needed, the four interfaces (see above) defined according to ETSI can be available on the option bus OB respectively alone or in combinations.

FIGS. 3 and 4 respectively show the embedding of an additional equipment interface according to preferred exemplary embodiments of the present invention into the architecture of the communication channel of a telephone of the Symphony type or, respectively, E-DSS1 type. The additional equipment interface supports a D-channel layer 3 signalling interface Y according to the AEI specification of ETSI.

FIG. 3 illustrates the additional equipment driver, which presents layer 3 in the private branch exchange, whereby a communication channel OAL that is offered by the terminal equipment TE allows communication with the additional equipment (AE-L2 and AE-L3). The terminal equipment TE and the additional equipment interface AEI thereby only serve as a transit line. The additional equipment driver comprises the drivers for the Y-L2 interface, the additional equipment AE and the EDSS-1 protocol. The layers L2 and L3 (LAP-S, $U_PN$ and Y-L1) as well as the speech protocol may be seen in FIG. 3, as described with reference to FIG. 1. The additional equipment driver in the private branch exchange PABX as well as the speech protocol are in communication with the virtual user surface of the private branch exchange PABX via the controller of the user surface UI.

FIG. 4 shows that an identical additional equipment interface also derives with the arrangement of the present invention given a terminal equipment of the E-DSS1 type as well. Here, a terminal equipment TE that comprises a user surface UI, a controller of the user surface UI, a layer L3 (E-DSS1 protocol, AE driver), a layer L2 (LAP-D, Y-L2) and a layer L1 (Y-L1) is connected via an additional equipment interface AEI to an additional equipment AE with the layers L1 (Y-L1), L2 (AE-L2) and L3 (AE-L3).

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for coupling optional additional equipment to terminal equipment of private branch exchanges via an additional equipment interface, comprising:

terminal equipment of the private branch exchange having an option bus that physically realizes an additional equipment interface and via which arbitrary additional equipment is connectable thereto;

an additional equipment driver in the private branch exchange, the additional equipment driver realizing an additional equipment protocol and the additional equipment driver being specific to the additional equipment;

the terminal equipment and the private branch exchange having communication devices, said communication devices realizing a communication channel between the additional equipment and the additional equipment driver in the private branch exchange, the additional equipment and the additional equipment driver communicating over the communication channel according to the protocol that is specific to the additional equipment.

2. The arrangement according to claim 1, wherein the additional equipment interface is a plug-type connection adapter.

3. The arrangement according to claim 1, wherein the option bus and the additional equipment driver specific to the additional equipment are interfaces defined according to AEI specification of ETSI.

4. The arrangement according to claim 1, wherein the option bus and the additional equipment driver specific to the additional equipment are a combination of interfaces defined according to AEI specification of ETSI.

5. An arrangement for coupling optional additional equipment to terminal equipment of private branch exchanges via an additional equipment interface, comprising:

terminal equipment of the private branch exchange having an option bus that physically realizes an additional equipment interface and via which arbitrary additional equipment is connectable thereto;

an additional equipment driver in the private branch exchange, the additional equipment driver realizing an additional equipment protocol and the additional equipment driver being specific to the additional equipment; and the terminal equipment and the private branch exchange having communication devices, said terminal equipment realizing a communication channel between the additional equipment and the additional equipment driver in the private branch exchange, the additional equipment and the additional equipment driver communicating over the communication channel according to the protocol that is specific to the additional equipment;

wherein functional logic is sequenced in the private branch exchange and wherein the additional equipment appears to be communicating with the additional equipment interface in the terminal equipment.

6. The arrangement according to claim 5, wherein the additional equipment interface a plug-type connection adapter.

7. The arrangement according to claim 5, wherein the option bus and the additional equipment driver specific to the additional equipment are interfaces defined according to AEI specification of ETSI.

8. The arrangement according to claim 5, wherein the option bus and the additional equipment driver specific to the additional equipment are a combination of interfaces defined according to AEI specification of ETSI.

9. An arrangement for coupling optional additional equipment to terminal equipment of private branch exchanges via an additional equipment interface, comprising:

terminal equipment of the private branch exchange having an option bus that physically realizes an additional equipment interface and via which arbitrary additional equipment is connectable thereto, said additional equipment interface supports a D-channel layer 3 signalling interface Y according to the AEI specification of ETSI;

an additional equipment driver in the private branch exchange, the additional equipment driver realizing an additional equipment protocol and the additional equipment driver being specific to the additional equipment;

the terminal equipment and the private branch exchange having communication devices, said communication devices realizing an E-DSS1 communication channel between the additional equipment and the additional equipment driver in the private branch exchange, the additional equipment and the additional equipment driver communicating over the communication channel according to the protocol that is specific to the additional equipment.

10. The arrangement according to claim 9, wherein the additional equipment interface is realized by a plug-type connection adapter.

11. The arrangement according to claim 9, wherein the option bus and the additional equipment driver specific to the additional equipment are at least one interface defined according to AEI specification of ETSI.

12. The arrangement according to claim 9, wherein the option bus and the additional equipment driver specific to the additional equipment are a combination of interfaces defined according to AEI specification of ETSI.

* * * * *